United States Patent
Hughes

(10) Patent No.: US 8,442,052 B1
(45) Date of Patent: May 14, 2013

(54) FORWARD PACKET RECOVERY

(75) Inventor: David Anthony Hughes, Los Altos, CA (US)

(73) Assignee: Silver Peak Systems, Inc., Santa Clara, CA (US)

(\*) Notice: Subject to any disclaimer, the term of this patent is extended or adjusted under 35 U.S.C. 154(b) by 252 days.

(21) Appl. No.: 12/070,796

(22) Filed: Feb. 20, 2008

(51) Int. Cl.
*H04L 12/56* (2006.01)

(52) U.S. Cl.
USPC ...... 370/394; 370/395.42; 370/415; 370/429; 370/474

(58) Field of Classification Search ........... 370/394; 714/48–50
See application file for complete search history.

(56) References Cited

U.S. PATENT DOCUMENTS

| | | | |
|---|---|---|---|
| 5,307,413 A | 4/1994 | Denzer | |
| 5,359,720 A | 10/1994 | Tamura et al. | |
| 5,483,556 A | 1/1996 | Pillan et al. | |
| 5,592,613 A | 1/1997 | Miyazawa et al. | |
| 5,611,049 A | 3/1997 | Pitts | |
| 5,675,587 A | 10/1997 | Okuyama et al. | |
| 5,754,774 A | 5/1998 | Bittinger et al. | |
| 5,802,106 A | 9/1998 | Packer | |
| 5,883,891 A * | 3/1999 | Williams et al. | 370/356 |
| 6,000,053 A * | 12/1999 | Levine et al. | 714/766 |
| 6,003,087 A | 12/1999 | Housel et al. | |
| 6,081,883 A | 6/2000 | Popelka et al. | |
| 6,295,541 B1 | 9/2001 | Bodnar et al. | |
| 6,311,260 B1 | 10/2001 | Stone et al. | |
| 6,374,266 B1 | 4/2002 | Shnelvar | |
| 6,434,662 B1 | 8/2002 | Greene et al. | |
| 6,438,664 B1 | 8/2002 | McGrath et al. | |
| 6,452,915 B1 | 9/2002 | Jorgensen | |
| 6,587,985 B1 | 7/2003 | Fukushima et al. | |
| 6,618,397 B1 | 9/2003 | Huang | |
| 6,633,953 B2 | 10/2003 | Stark | |
| 6,643,259 B1 | 11/2003 | Borella et al. | |
| 6,650,644 B1 | 11/2003 | Colley et al. | |
| 6,718,361 B1 | 4/2004 | Basani et al. | |
| 6,738,379 B1 * | 5/2004 | Balazinski et al. | 370/394 |
| 6,769,048 B2 | 7/2004 | Goldberg et al. | |
| 6,791,945 B1 * | 9/2004 | Levenson et al. | 370/235 |

(Continued)

FOREIGN PATENT DOCUMENTS

EP 1507353 A2 2/2005

OTHER PUBLICATIONS

Zhao et al.; "Analysis and Improvement on IPSEC Anti-Replay Window Protocol"; 2003; IEEE' pp. 553-558.

(Continued)

*Primary Examiner* — Alvin Zhu
(74) *Attorney, Agent, or Firm* — Carr & Ferrell LLP

(57) ABSTRACT

A method for providing ordered data packets to a processor is provided. The method comprises receiving a plurality of data packets, each comprising an order identifier. At least one out-of-order data packet of the plurality of data packets is placed in a priority queue. One or more correction packets are received. One or more missing data packets or corrupted data packets of the plurality of data packets are detected based on the one or more correction packets. The one or more missing data packets or corrupted data packets of the plurality of data packets are corrected based on the one or more correction packets. The one or more corrected data packets are provided to the processor. The at least one out-of-order data packet in the priority queue is provided to the processor.

18 Claims, 8 Drawing Sheets

U.S. PATENT DOCUMENTS

| | | | |
|---|---|---|---|
| 6,856,651 B2 | 2/2005 | Singh | |
| 6,859,842 B1 | 2/2005 | Nakamichi et al. | |
| 6,910,106 B2 | 6/2005 | Sechrest et al. | |
| 6,978,384 B1 | 12/2005 | Milliken | |
| 7,007,044 B1 | 2/2006 | Rafert et al. | |
| 7,020,750 B2 | 3/2006 | Thiyagaranjan et al. | |
| 7,035,214 B1* | 4/2006 | Seddigh et al. | 370/231 |
| 7,069,342 B1 | 6/2006 | Biederman | |
| 7,113,962 B1 | 9/2006 | Kee et al. | |
| 7,120,666 B2 | 10/2006 | McCanne et al. | |
| 7,145,889 B1 | 12/2006 | Zhang et al. | |
| 7,197,597 B1 | 3/2007 | Scheid et al. | |
| 7,200,847 B2 | 4/2007 | Straube et al. | |
| 7,215,667 B1 | 5/2007 | Davis | |
| 7,242,681 B1 | 7/2007 | Van Bokkelen et al. | |
| 7,243,094 B2 | 7/2007 | Tabellion et al. | |
| 7,266,645 B2 | 9/2007 | Garg et al. | |
| 7,318,100 B2 | 1/2008 | Demmer et al. | |
| 7,366,829 B1 | 4/2008 | Luttrell et al. | |
| 7,380,006 B2 | 5/2008 | Srinivas et al. | |
| 7,383,329 B2 | 6/2008 | Erickson | |
| 7,383,348 B2 | 6/2008 | Seki et al. | |
| 7,388,844 B1 | 6/2008 | Brown et al. | |
| 7,389,357 B2 | 6/2008 | Duffie et al. | |
| 7,389,393 B1 | 6/2008 | Karr et al. | |
| 7,417,991 B1 | 8/2008 | Crawford et al. | |
| 7,420,992 B1 | 9/2008 | Fang et al. | |
| 7,428,573 B2 | 9/2008 | McCanne et al. | |
| 7,451,237 B2 | 11/2008 | Takekawa et al. | |
| 7,453,379 B2 | 11/2008 | Plamondon | |
| 7,457,315 B1 | 11/2008 | Smith | |
| 7,471,629 B2 | 12/2008 | Melpignano | |
| 7,532,134 B2 | 5/2009 | Samuels et al. | |
| 7,555,484 B2 | 6/2009 | Kulkarni et al. | |
| 7,571,343 B1 | 8/2009 | Xiang et al. | |
| 7,619,545 B2 | 11/2009 | Samuels et al. | |
| 7,620,870 B2 | 11/2009 | Srinivasan et al. | |
| 7,639,700 B1 | 12/2009 | Nabhan et al. | |
| 7,676,554 B1 | 3/2010 | Malmskog et al. | |
| 7,714,747 B2 | 5/2010 | Fallon | |
| 7,746,781 B1 | 6/2010 | Xiang | |
| 7,849,134 B2 | 12/2010 | McCanne et al. | |
| 7,853,699 B2 | 12/2010 | Wu et al. | |
| 7,953,869 B2 | 5/2011 | Demmer et al. | |
| 2001/0054084 A1 | 12/2001 | Kosmynin | |
| 2002/0007413 A1 | 1/2002 | Garcia-Luna-Aceves et al. | |
| 2002/0040475 A1 | 4/2002 | Yap et al. | |
| 2002/0065998 A1 | 5/2002 | Buckland | |
| 2002/0078242 A1 | 6/2002 | Viswanath | |
| 2002/0101822 A1 | 8/2002 | Ayyagari et al. | |
| 2002/0107988 A1 | 8/2002 | Jordan | |
| 2002/0116424 A1 | 8/2002 | Radermacher et al. | |
| 2002/0131434 A1* | 9/2002 | Vukovic et al. | 370/411 |
| 2002/0150041 A1 | 10/2002 | Reinshmidt et al. | |
| 2002/0163911 A1 | 11/2002 | Wee et al. | |
| 2002/0169818 A1 | 11/2002 | Stewart et al. | |
| 2002/0181494 A1 | 12/2002 | Rhee | |
| 2002/0188871 A1 | 12/2002 | Noehring et al. | |
| 2002/0194324 A1 | 12/2002 | Guha | |
| 2003/0009558 A1 | 1/2003 | Ben-Yehezkel | |
| 2003/0123481 A1 | 7/2003 | Neale et al. | |
| 2003/0142658 A1 | 7/2003 | Ofuji et al. | |
| 2003/0149661 A1 | 8/2003 | Mitchell et al. | |
| 2003/0233431 A1 | 12/2003 | Reddy et al. | |
| 2004/0008711 A1 | 1/2004 | Lahti et al. | |
| 2004/0047308 A1 | 3/2004 | Kavanagh et al. | |
| 2004/0083299 A1 | 4/2004 | Dietz et al. | |
| 2004/0114569 A1 | 6/2004 | Naden et al. | |
| 2004/0117571 A1 | 6/2004 | Chang et al. | |
| 2004/0123139 A1 | 6/2004 | Aiello et al. | |
| 2004/0199771 A1 | 10/2004 | Morten et al. | |
| 2004/0202110 A1 | 10/2004 | Kim | |
| 2004/0203820 A1 | 10/2004 | Billhartz | |
| 2004/0205332 A1 | 10/2004 | Bouchard et al. | |
| 2004/0243571 A1 | 12/2004 | Judd | |
| 2004/0255048 A1 | 12/2004 | Lev Ran et al. | |
| 2005/0010653 A1 | 1/2005 | McCanne | |
| 2005/0044270 A1 | 2/2005 | Grove et al. | |
| 2005/0053094 A1 | 3/2005 | Cain et al. | |
| 2005/0091234 A1 | 4/2005 | Hsu et al. | |
| 2005/0111460 A1 | 5/2005 | Sahita | |
| 2005/0131939 A1 | 6/2005 | Douglis et al. | |
| 2005/0132252 A1 | 6/2005 | Fifer et al. | |
| 2005/0141425 A1 | 6/2005 | Foulds | |
| 2005/0171937 A1 | 8/2005 | Hughes et al. | |
| 2005/0177603 A1 | 8/2005 | Shavit | |
| 2005/0190694 A1 | 9/2005 | Ben-Nun et al. | |
| 2005/0210151 A1 | 9/2005 | Abdo et al. | |
| 2005/0220019 A1 | 10/2005 | Melpignano | |
| 2005/0235119 A1 | 10/2005 | Sechrest et al. | |
| 2005/0243743 A1 | 11/2005 | Kimura | |
| 2005/0256972 A1 | 11/2005 | Cochran et al. | |
| 2005/0278459 A1 | 12/2005 | Boucher et al. | |
| 2005/0286526 A1* | 12/2005 | Sood et al. | 370/394 |
| 2006/0013210 A1 | 1/2006 | Bordogna et al. | |
| 2006/0031936 A1 | 2/2006 | Nelson et al. | |
| 2006/0036901 A1 | 2/2006 | Yang et al. | |
| 2006/0039354 A1 | 2/2006 | Rao et al. | |
| 2006/0059171 A1 | 3/2006 | Borthakur et al. | |
| 2006/0059173 A1 | 3/2006 | Hirsch et al. | |
| 2006/0117385 A1 | 6/2006 | Mester et al. | |
| 2006/0143497 A1 | 6/2006 | Zohar et al. | |
| 2006/0195547 A1 | 8/2006 | Sundarrajan et al. | |
| 2006/0195840 A1 | 8/2006 | Sundarrajan et al. | |
| 2006/0212426 A1 | 9/2006 | Shakara et al. | |
| 2006/0218390 A1 | 9/2006 | Loughran et al. | |
| 2006/0227717 A1 | 10/2006 | van den Berg et al. | |
| 2006/0250965 A1 | 11/2006 | Irwin | |
| 2006/0280205 A1* | 12/2006 | Cho | 370/473 |
| 2007/0002804 A1 | 1/2007 | Xiong et al. | |
| 2007/0011424 A1 | 1/2007 | Sharma et al. | |
| 2007/0076693 A1 | 4/2007 | Krishnaswamy | |
| 2007/0110046 A1 | 5/2007 | Farrell et al. | |
| 2007/0115812 A1 | 5/2007 | Hughes | |
| 2007/0127372 A1 | 6/2007 | Khan et al. | |
| 2007/0130114 A1 | 6/2007 | Li et al. | |
| 2007/0140129 A1 | 6/2007 | Bauer et al. | |
| 2007/0174428 A1 | 7/2007 | Lev Ran et al. | |
| 2007/0195702 A1 | 8/2007 | Yuen et al. | |
| 2007/0198523 A1 | 8/2007 | Hayim | |
| 2007/0226320 A1 | 9/2007 | Hager et al. | |
| 2007/0244987 A1 | 10/2007 | Pedersen et al. | |
| 2007/0245079 A1 | 10/2007 | Bhattacharjee et al. | |
| 2007/0258468 A1 | 11/2007 | Bennett | |
| 2007/0263554 A1 | 11/2007 | Finn | |
| 2007/0276983 A1 | 11/2007 | Zohar et al. | |
| 2008/0005156 A1 | 1/2008 | Edwards et al. | |
| 2008/0013532 A1 | 1/2008 | Garner et al. | |
| 2008/0016301 A1 | 1/2008 | Chen | |
| 2008/0028467 A1 | 1/2008 | Kommareddy et al. | |
| 2008/0133536 A1 | 6/2008 | Bjorner et al. | |
| 2008/0184081 A1* | 7/2008 | Hama et al. | 714/708 |
| 2008/0229137 A1 | 9/2008 | Samuels et al. | |
| 2008/0243992 A1 | 10/2008 | Jardetzky et al. | |
| 2008/0313318 A1 | 12/2008 | Vermeulen et al. | |
| 2008/0320151 A1 | 12/2008 | McCanne et al. | |
| 2009/0060198 A1 | 3/2009 | Little | |
| 2009/0100483 A1 | 4/2009 | McDowell | |
| 2009/0158417 A1 | 6/2009 | Khanna et al. | |
| 2009/0175172 A1 | 7/2009 | Prytz et al. | |
| 2009/0234966 A1 | 9/2009 | Samuels et al. | |
| 2010/0011125 A1 | 1/2010 | Yang et al. | |
| 2010/0020693 A1 | 1/2010 | Thakur | |
| 2010/0115137 A1 | 5/2010 | Kim et al. | |
| 2010/0290364 A1 | 11/2010 | Black | |

OTHER PUBLICATIONS

Singh et al. ;"Future of Internet Security-IPSEC"; 2005; pp. 1-8.

"Muthitacharoen, Athicha et al., ""A Low-bandwidth Network File System,"" 2001, in Proc. ofthe 18th ACM Symposium on Operating Systems Principles, Banff, Canada, pp. 174-187."

Shared LAN Cache Datasheet, 1996, http://www.lancache.com/slcdata.htm.

""""A protocol-independent technique for eliminating redundant network traffic"""", ACM SIGCOMM Computer CommunicationReview, vol. 30, Issue 4 (Oct. 2000) pp. 87-95, Year of Publication: 2000".

"B. Hong, D. Plantenberg, D. D. E. Long, and M. Sivan-Zimet. ""Duplicate data elimination in a SAN file system"", InProceedings of the 21 st Symposium on Mass Storage Systems (MSS '04), Goddard, MD, Apr. 2004. IEEE."

"You, L. L. and Karamanolis, C. 2004. ""Evaluation of efficient archival storage techniques"", In Proceedings of the 21st IEEESymposium on Mass Storage Systems and Technologies (MSST)."

"Fred Douglis and Arun Iyengar, Application specific Delta-encoding via Resemblance Detection", Published in the 2003 USENIX Annual Technical Conference.

"You L. L. et al., ""Deep Store An Archival Storage System Architecture"" Data Engineering, 2005. ICDE 2005. Proceedings. 21st.inti Conf on Tokyo, Japan, Apr. 5-8, 2005, pp. 12".

"Udi Manber. ""Finding Similar Files in a Large File System"", TR 93-33 Oct. 1994, Department of Computer Science,University of Arizona. http://webglimpse.net/pubs/TR93-33.pdf. Also appears in the 1994 winter USENIX Technical Conference."

* cited by examiner

800

802

SEQUENCE: 1,5,7,6,8,4,10,9,3,2

PRIMARY QUEUE
804

SECONDARY QUEUE
806

TERTIARY QUEUE
808

FORWARD PACKET RECOVERY

BACKGROUND

1. Field of the Invention

The present invention relates generally to network communications and more specifically to forward packet recovery.

2. Description of the Related Art

Typically, data is sent between computing devices across a communications network (e.g., the Internet) in packets. The data packets may be generated according to a variety of protocols such as Transmission Control Protocol (TCP), User Datagram Protocol (UDP), or the like. During transmission, packets may be lost, corrupted, or received out of order. In these instances, the computing device sending the packets may resend the packets or the computing device receiving the packets may reconstruct the packets using known methods.

SUMMARY

A method for providing ordered data packets to a processor is provided. The method comprises receiving a plurality of data packets, each comprising an order identifier. At least one out-of-order data packet of the plurality of data packets is placed in a priority queue. One or more correction packets are received. One or more missing data packets or corrupted data packets of the plurality of data packets are detected based on the one or more correction packets. The one or more missing data packets or corrupted data packets of the plurality of data packets are corrected based on the one or more correction packets. The one or more corrected data packets are provided to the processor. The at least one out-of-order data packet in the priority queue is provided to the processor.

A method for providing correction packets is provided. The method comprises generating a first number of data packets and a first number of correction packets based on a first correction ratio. A portion of the first number of data packets is transmitted to a network device. A time-out indication is received from the network device. A second correction ratio is calculated based on the first correction ratio and the portion of the transmitted first number of data packets. A second number of correction packets is provided to the network device, at least one of the second number of correction packets indicating the second correction ratio.

A system for providing ordered data packets to a processor is provided. The system comprises a receiving module, a data correction module, and an ordering module. The receiving module is configured to receive a plurality of data packets and one or more correction packets, each data packet comprising an order identifier. The data correction module is configured to detect one or more missing data packets or corrupted data packets of the plurality of data packets based on the one or more correction packets and correct the one or more missing data packets or corrupted data packets of the plurality of data packets based on the one or more correction packets. The ordering module is configured to place at least one out-of-order data packet of the plurality of data packets in a priority queue, provide the one or more corrected data packets to the processor, and provide the at least one out-of-order data packet in the priority queue to the processor.

A system for providing correction packets is provided. The system comprises a data correction module and a transmitting module. The transmitting module is configured to generate a first number of data packets and a first number of correction packets based on a first correction ratio, receive a time-out indication from the network device, calculate a second correction ratio based on the first correction ratio and a portion of the first number of data packets, and provide a second number of correction packets to the network device, at least one of the second number of correction packets indicating the second correction ratio. The transmitting module is configured to transmit the portion of the first number of data packets and the second number of correction packets to a network device.

A computer readable medium having embodied thereon instructions executable by a processor for performing a method for providing ordered data packets to a processor is provided. The method comprises receiving a plurality of data packets, each comprising an order identifier. At least one out-of-order data packet of the plurality of data packets is placed in a priority queue. One or more correction packets are received. One or more missing data packets or corrupted data packets of the plurality of data packets are detected based on the one or more correction packets. The one or more missing data packets or corrupted data packets of the plurality of data packets are corrected based on the one or more correction packets. The one or more corrected data packets are provided to the processor. The at least one out-of-order data packet in the priority queue is provided to the processor.

A computer readable medium having embodied thereon instructions executable by a processor for performing a method for providing correction packets is provided. The method comprises generating a first number of data packets and a first number of correction packets based on a first correction ratio. A portion of the first number of data packets is transmitted to a network device. A time-out indication is received from the network device. A second correction ratio is calculated based on the first correction ratio and the portion of the transmitted first number of data packets. A second number of correction packets is provided to the network device, at least one of the second number of correction packets indicating the second correction ratio.

DETAILED DESCRIPTION

Exemplary systems and methods for forward packet recovery are provided. Forward packet recovery can be used to reconstruct missing data packets and corrupted data packets and order the received and reconstructed data packets prior to processing according to a protocol such as Transmission Control Protocol (TCP), User Datagram Protocol (UDP), or the like. In order to perform forward packet recovery, correction packets are sent with the data packets. Typically, one correction packet can be used to reconstruct one missing or corrupted data packet. However, sending the correction packets in addition to the data packets uses more bandwidth in a communication network which may, in turn, slow communications between network devices. However, not sending a sufficient number of correction packets may result in having to resend data packets.

Figure 1:
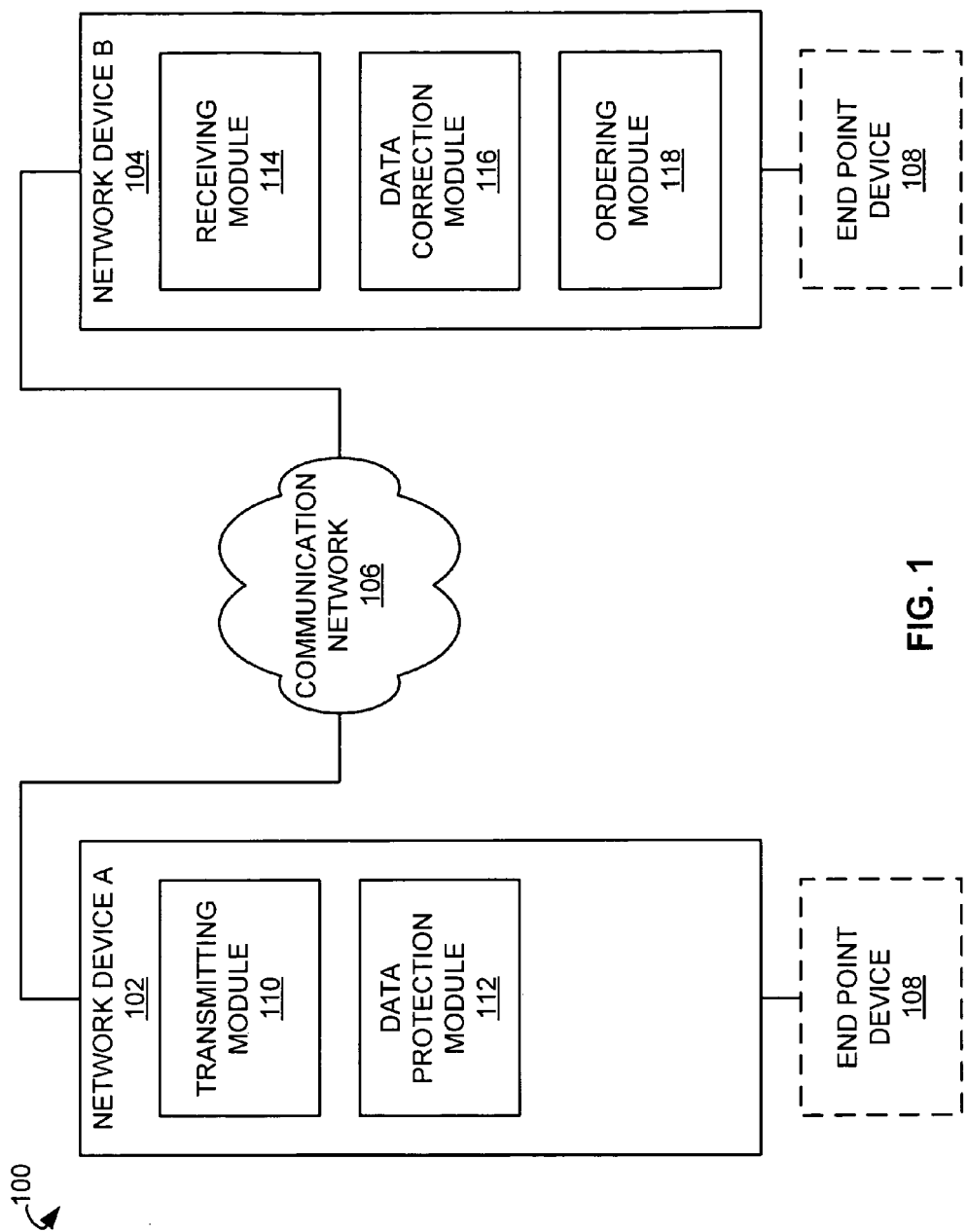
FIG. 1 is a diagram of an environment in which various embodiments of the invention may be practiced.

FIG. 1 is a diagram of an environment 100 in which various embodiments of the invention may be practiced. The environment 100 comprises a network device A 102 and a network device B 104 communicatively coupled via a communication network 106. The communication network 106 may comprise a Wide Area Network, the Internet, or the like as will be apparent to those skilled in the art. The network device A 102 and the network device B 104 may be communicatively coupled to optional endpoint devices 108 which are not communicatively coupled to the communication network 106. The endpoint devices 108 may comprise a computer, a server, or the like as will be apparent to those skilled in the art.

The network device A 102 is configured to send data packets to the network device B 104 via the communication network 106. In some embodiments, the network device A 102 comprises a computer, a server, a router, a network appliance, or the like. A network appliance is described in U.S. patent application Ser. No. 11/202,697 filed Aug. 12, 2005 and entitled "Network Memory Architecture for Providing Data Based on Local Accessibility." The network device A 102 comprises, at least, a transmitting module 110 and a data protection module 112.

The transmitting module 110 is configured to generate data packets to be sent via the communication network 106 according to a protocol such as Transmission Control Protocol (TCP), User Datagram Protocol (UDP), or the like. The transmitting module may generate the data packets based on data received from the optional endpoint device 108.

The data protection module 112 is configured to generate correction packets based on data packets generated by the transmitting module 110 and a correction ratio. Correction packets may be used by, for example, the network device B 104 to reconstruct data packets that are corrupted or missing. The correction ratio indicates the number of correction packets per the number of data packets.

In some embodiments, one correction packet is sent with each frame. The correction packet may be a byte-wise exclusive-or (XOR) of all of the data packets in the frame. As is known to those skilled in the art, any single missing or corrupted data packet can be recovered using an XOR operation. Although the XOR operation is discussed, there are many ways one or more missing or corrupted data packet that can be recovered.

In various embodiments, the data protection module 112 is configured to generate more than one correction packet per a defined number of data packets. For example, the correction ratio may be 8:40 indicating that, for a frame comprising forty data packets, eight distinct correction packets are additionally generated. This may be performed using a unique, identifiable function to generate each of the correction packets. Using a ratio of 8:40 rather than a ratio of 1:5 allows for more missing or corrupted packets that are, for example, sequential to one another, to be reconstructed and thus avoids resending multiple packets. The more than one correction packets may be generated based on algorithms using Reed-Solomon coding and finite field arithmetic, as is known to those skilled in the art.

Further, in some embodiments, the data protection module 112 is configured to change the correction ratio in the event that a transmission of a series of data packets fails. The transmission may fail if, for example, the transmission of the number of data packets identified in the correction ratio "times out." This feature is discussed in greater detail in connection with FIG. 2.

The network device B 104 comprises, at least, a receiving module 114, a data correction module 116, and an ordering module 118. The network device B 104 may additionally be configured as a network device A 102 and may be a computer, server, router, network appliance, or the like. The processes performed by the network device B 104 are discussed in greater detail in connection with FIG. 3.

The receiving module 114 is configured to receive data packets and correction packets from the network device A 102 via the communication network 106. In some embodiments, the network device B 104 is configured to copy incoming packets, to send one copy to the data correction module 116, and send the other copy to the ordering module 118.

The data correction module 116 is configured to determine if any data packets are missing or corrupted. If any data packets are missing or corrupted, the data correction module 116 is configured to determine whether the missing or corrupted packets can be reconstructed using received correction packets and, if the packets can be reconstructed, reconstruct the packets. The data correction module 116 is configured to send only the data packets to the ordering module 118. The processes performed by the data correction module 116 are discussed in greater detail in FIG. 4.

The ordering module 118 is configured to order the received packets, or copies of the received packets, and the reconstructed packets prior to processing. Processes performed by the ordering module 118 are discussed in greater detail in connection with FIGS. 5-8.

Figure 2:
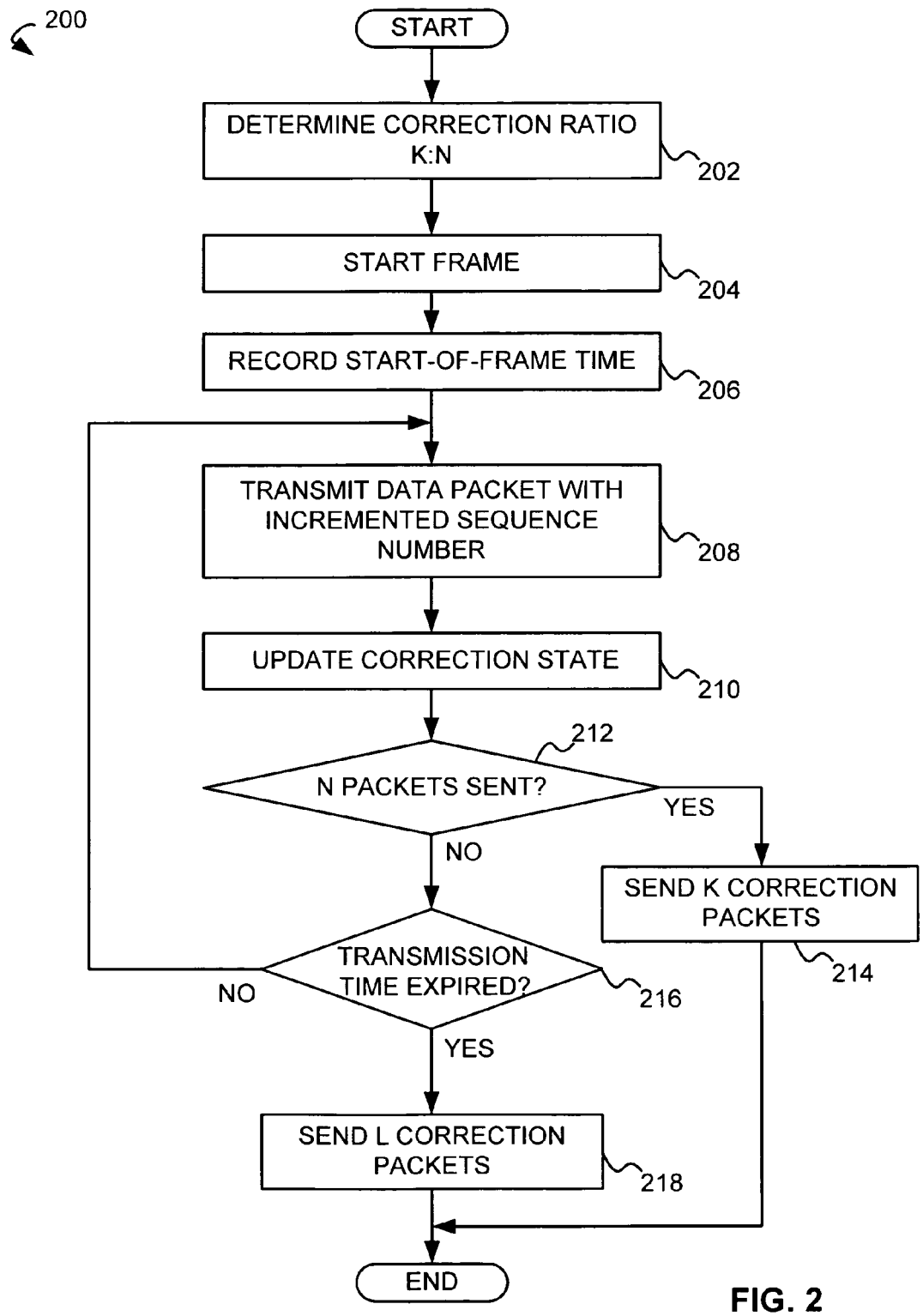
FIG. 2 is a flowchart of an exemplary process for modifying a correction ratio according to various embodiments.

FIG. 2 is a flowchart of an exemplary process 200 for modifying a correction ratio according to various embodiments. The process 200 may be performed by the data correction module 112 in the network device A 102.

In step 202, an initial correction ratio, K:N, indicating a first number of correction packets per a second number of data packets in a frame, is determined. This determination may be based on a default value or a previous loss rate on the communication network 106. For example, the network device A 102 may receive a message from the network device B 104 indicating a number of data packets or a percentage that were lost. In other instances, no request to resend data packets is received or a message indicating that no data packets were lost is received. Responsive to the message and previous messages, the network device A 102 may change the correction ratio to include more or fewer correction packets or data packets in a subsequent frame. The change in the correction ratio may be calculated or based on a look-up table. In some embodiments, the change in correction ratio may include setting the number of correction packets to zero.

In step 204, a frame comprising data packets and correction packets is started. In step 206, the start-of-frame time is recorded. In step 208, a data packet associated with the frame is transmitted. The data packet may include an incremented sequence number.

In step 210, a correction state is updated. The correction state is used to generate correction packets after the data packets have been sent. In embodiments where an XOR algorithm is used to generate the correction packets, the correction state may include an XOR of the sent data packets.

In step 212, a determination is made as to whether all of the N data packets in the frame have been sent. In step 214, if all of the N data packets have been sent, the K correction packets, based on the correction state, are sent according to the correction ratio determined in step 202. The K correction packets may include an indication of the correction ratio, K:N.

In step 216, if not all of the N data packets have been sent, a second determination is made as to whether a transmission time has expired. The transmission time is measured from the start-of-frame time recorded in step 206. To determine whether the transmission time has expired, the transmission time is compared to a threshold. The threshold may be predefined or dynamic as will be apparent to those skilled in the art. If the transmission time has not expired, the process 200 returns to step 208.

If, however, the transmission time has expired, a third number, L, of correction packets are sent in step 218. If the transmission time has expired, the correction ratio is adjusted based on the number of data packets already sent. The adjusted correction ratio is used to determine the number L of correction packets to be generated based on the correction state. For example, if the correction ratio determined in step 202 is 8:40 and only ten data packets are sent before the transmission time expires, only two correction packets may be sent. The L correction packets may include an indication of the new correction ratio, L:N.

Figure 3:
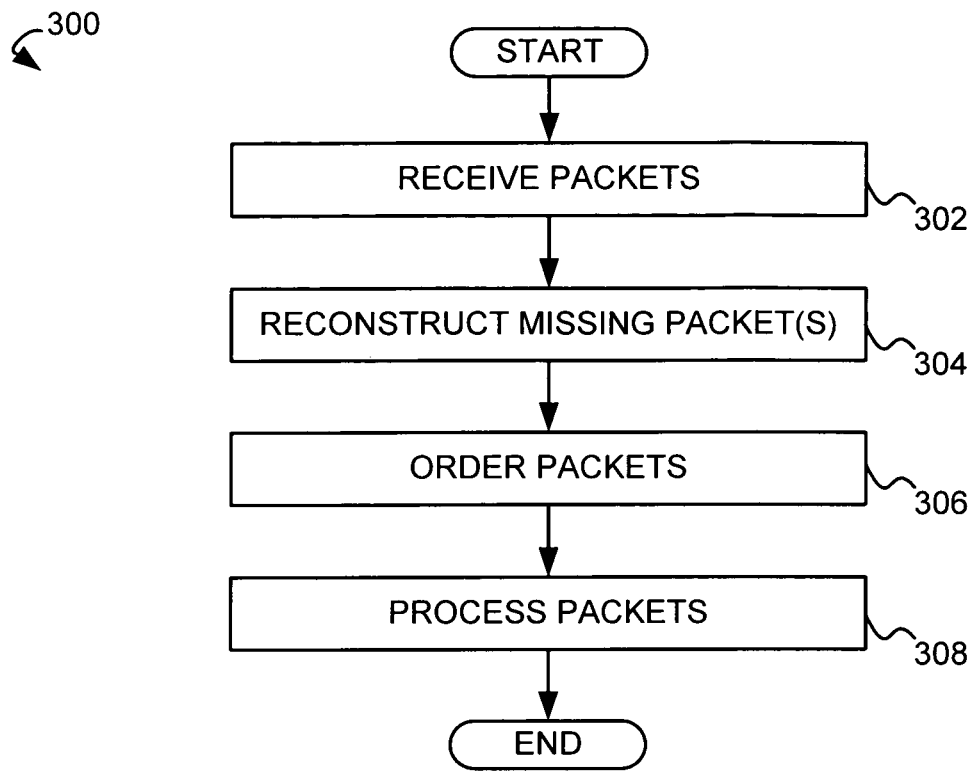
FIG. 3 is a flowchart of an exemplary process for forward packet recovery according to various embodiments.

FIG. 3 is a flowchart of an exemplary process 300 for forward packet recovery according to various embodiments. The process 300 may be performed by the network device B 104.

In step 302, packets are received from, for example, network device A 102. The received packets include data packets and correction packets. The received packets may be out of order or corrupted. In some embodiments, a copy of the received data packets is generated. Step 302 may be performed by the receiving module 114 of the network device B 104.

In step 304, missing data packets, including corrupted data packets, are reconstructed using the correction packets. If there are no missing data packets in the frame, the correction packets in the frame are disregarded. An exemplary process for reconstructing the packets is provided in connection with FIG. 4.

In step 306, the data packets, including the received data packets and the reconstructed data packets, are ordered. An exemplary process for ordering the data packets is provided in connection with FIGS. 5-8. By ordering the packets after the missing packets are reconstructed, the reconstructed data packets are ordered concurrently with the received data packets which may reduce delays caused by reconstructing data packets.

In step 308, the ordered data packets are processed. The processing may include sending a resend request indicating missing data packets that were not reconstructed.

Figure 4:
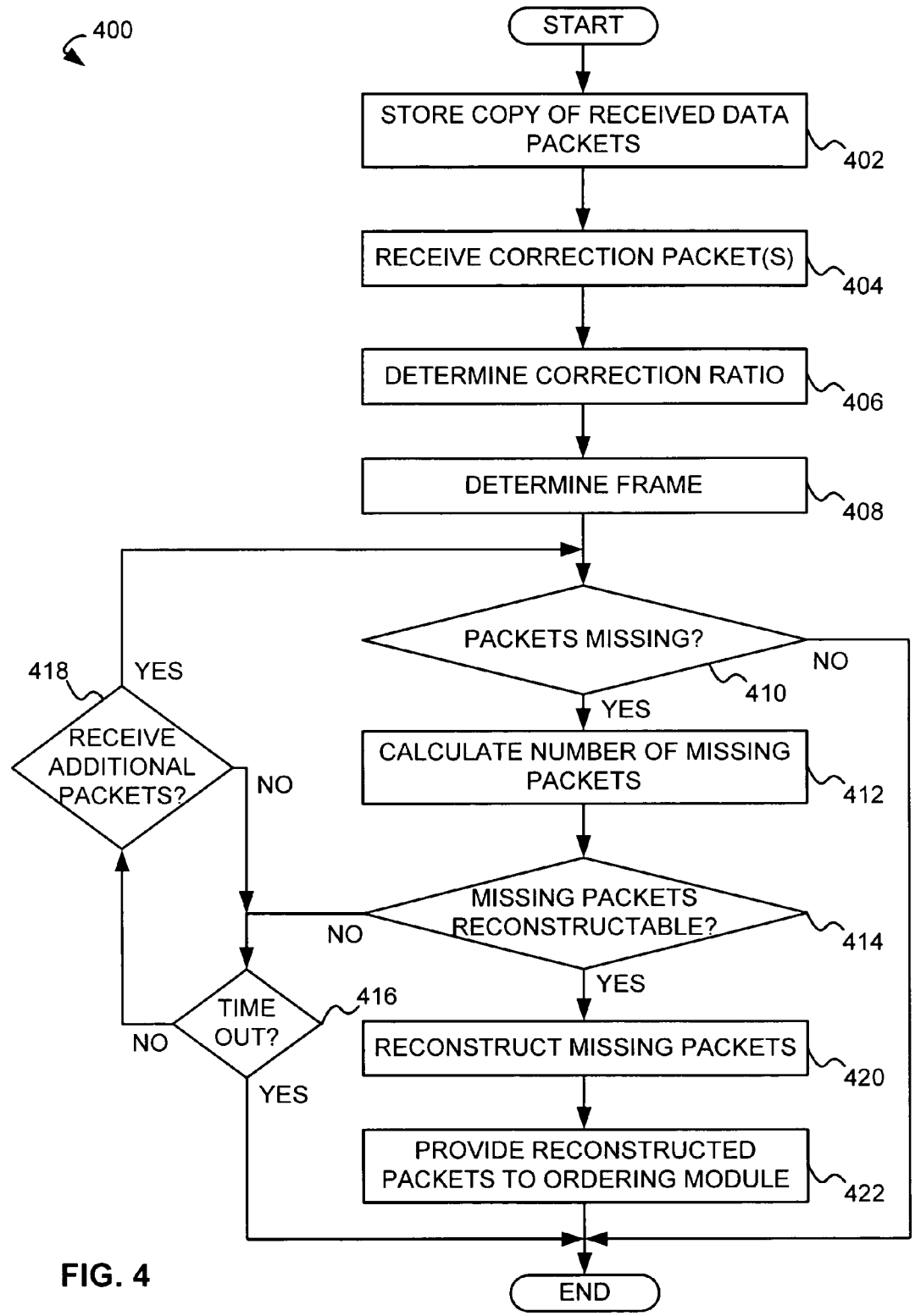
FIG. 4 is a flowchart of an exemplary process for reconstruction of missing data packets according to various embodiments.

FIG. 4 is a flowchart of an exemplary process 400 for reconstruction of missing data packets according to various embodiments. The exemplary process 400 may be performed in step 304 of the process 300. The process 400 may be performed by the data correction module 116 in the network device B 104.

In step 402, a copy of the received data packets may be stored in a memory accessible by the data correction module 116. The received data packet may be forwarded to the ordering module 118. For example, the received data packet may be forwarded to the ordering module 118. In some embodiments, the received data packet is forwarded immediately to the ordering module 118.

In step 404, one or more correction packets are received. In step 406, the correction ratio may be determined from at least one of the correction packets.

In step 408, based on the correction ratio, the size of the frame is determined. For example, if the correction ratio indicates that there are forty data packets and eight correction packets, the frame is determined to include forty spaces for data packets and eight spaces for correction packets. The correction packets and the copies of the received data packets are populated into the frame. It should be noted that packets belonging to different frames may be received simultaneously.

In step 410, based on the populated frame, a determination is made as to whether any data packets are missing. If no data packets are missing, no data packets need to be reconstructed and process 400 ends.

If, however, there are any data packets missing, the number of missing packets is calculated in step 412. In step 414, a determination is made as to whether the missing data packets can be reconstructed using the correction packets. In general, to reconstruct multiple data packets, a number of correction packets equal to or greater than the number of missing data packets is required.

If the missing packets cannot be reconstructed, another determination is made as to whether the frame has timed out, in step 416. The determination is based on the amount of time that has lapsed since the first packet of the frame arrived and a threshold time-out time. The threshold may be pre-defined or changed based on network delay. In some embodiments, a time-out period associated with a frame is based on a memory management algorithm such as first-in-first-out (FIFO) as will be apparent to those skilled in the art. Further, those skilled in the art will appreciate that any number of algorithms may be used to determine the time-out period. If the frame has timed-out, the process 400 ends.

If, however, the frame has not yet timed-out, a determination as to whether additional packets have been received is made in step 418. The additional packets may be data packets or correction packets. The amount of time waited may depend on factors such as whether any additional data packets were received, the threshold time-out time, a defined amount of time, or the like as will be apparent to those skilled in the art. If additional packets have been received, the process 400 returns to step 410. If, however, additional packets have not been received, the process 400 returns to step 416.

If a determination was made in step 414 that the missing data packets can be reconstructed, the missing data packets are reconstructed in step 420. The reconstructed data packets may then be provided to the ordering module 118 in step 422.

Although the time-out period is discussed regarding step 416, the time-out period can expire at any time. When the time-out period expires, data may be transmitted from the priority queue as further discussed in FIGS. 5-8.

Figure 5:
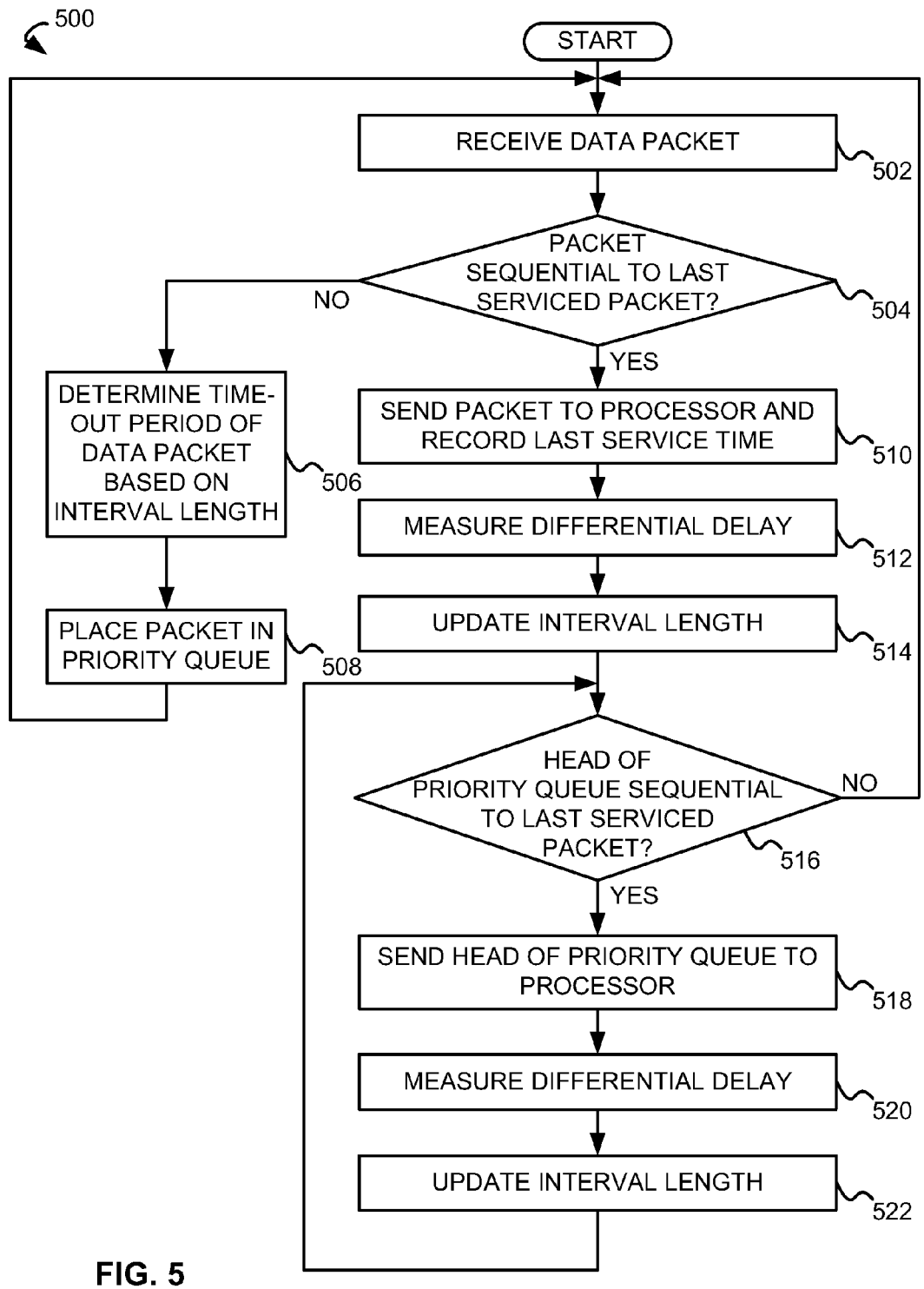
FIG. 5 is a flowchart of an exemplary process for ordering data packets according to various embodiments.

FIG. 5 is a flowchart of an exemplary process 500 for ordering data packets according to various embodiments. The process 500 may be performed by the ordering module 118 in the network device B 104.

In step 502, a data packet or a copy of the data packet is received. The data packet may be received from the data correction module 116 of the network device B 104. The data packet may include a sequence number indicating its position relative to other data packets.

In step 504, a determination is made as to whether the data packet is sequential to a last serviced packet based, for example, on the sequence number of the data packet. In various embodiments, the data packets are sent packet-by-packet, in order, to a processor.

If the data packet is not sequential to the last serviced packet, a time-out period of the data packet is determined based on an interval length in step 506. The interval length is calculated based on measured delays between receiving previous sequential packets. The interval length may be based on an average, a distribution of differential delays, or the like as will be apparent to those skilled in the art. In step 508, the packet is placed in the priority queue. An exemplary priority queue is described in connection with FIGS. 7 and 8. The process 500 then returns to step 502.

If, however, the data packet is sequential to the last serviced packet as determined in step 504, the data packet is sent to the processor in step 510. Also in step 510, a last service time is recorded when the packet is sent. The last service time may be used to measure the differential delay in step 512. The received data packet now becomes the last serviced packet within the process 500.

In step 512, the differential delay is measured by calculating the amount of time that has lapsed between sending sequential data packets to the processor. The measurement may include calculating a difference between time stamps associated with a previous last serviced packet and the last service time. In other embodiments, the differential delay may be measured by a counter which is reset each time a data packet is sent to the processor.

In step 514, the measured differential delay is used to update the interval length. The interval length is described in connection with step 506.

In step 516, a determination is made as to whether a head of the priority queue is sequential to the last serviced packet. The head of the priority queue is the data packet in the priority queue that has the lowest sequence number of all of the packets in the priority queue. If the head of the priority queue is not sequential to the last serviced packet, the process 500 returns to step 502.

If the head of the priority queue is sequential to the last serviced packet, the head of the priority queue is sent to the processor in step 518. In step 520, the differential delay between the last serviced packet and the time at which the head of the priority queue was received (step 502) is measured. In step 522, the interval length is updated at least as described in connection with step 514. The process 500 returns to step 516.

Figure 6:
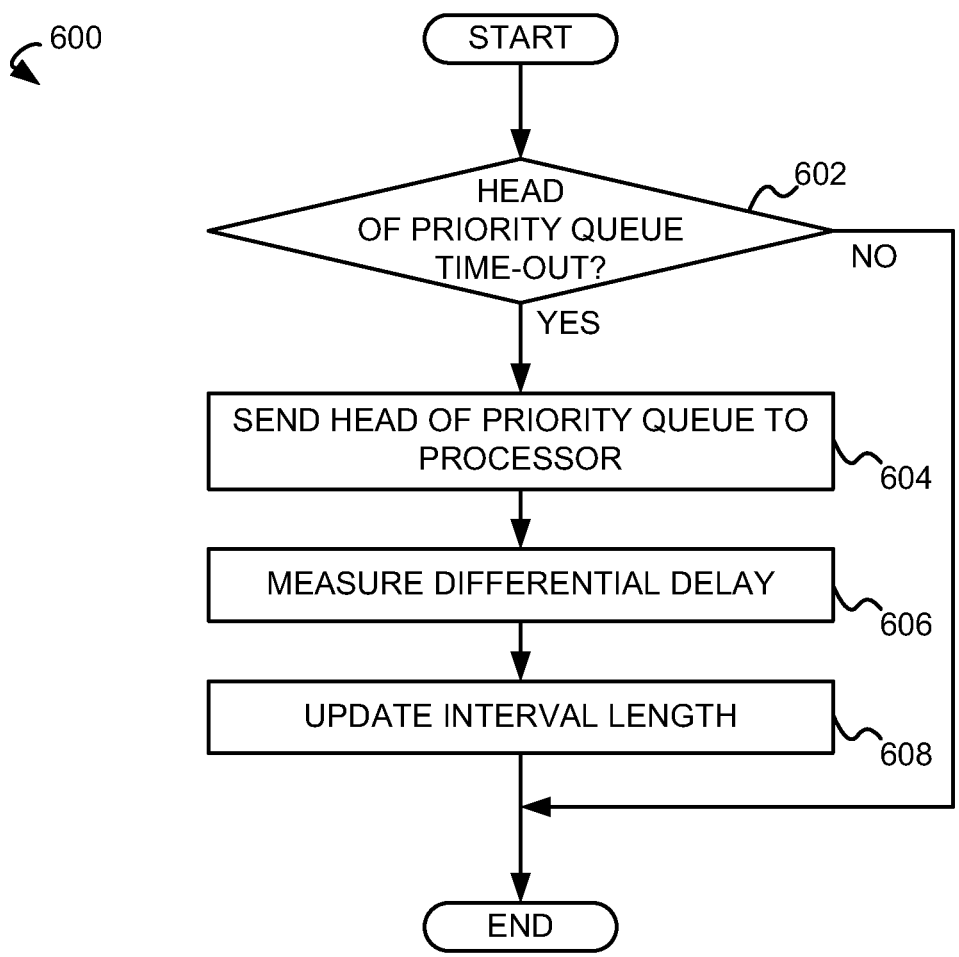
FIG. 6 is a flowchart of an exemplary process for releasing a data packet from a priority queue in the event of a missing data packet according to various embodiments.

FIG. 6 is a flowchart of an exemplary process 600 for releasing a data packet from a priority queue in the event of a missing or very late data packet according to various embodiments. The process 600 may be performed by the ordering module 118 in the network device B 104. The process 600 may be performed independently of the process 500.

In step 602, a determination is made as to whether the time-out period of head of the priority queue (described in connection with step 502 of the process 500) has elapsed. If the time-out period has not elapsed, the process 600 ends.

If the time-out period has elapsed, the head of the priority queue is sent to the processor in step 604. Thus, in the event of a missing packet that can not be reconstructed by the data correction module 116, the data packets are still sent to the processor. The processor may then, upon determining that a data packet is missing, send a resend request to the network device A 102 according to, for example, TCP. In step 606, the differential delay is measured, and in step 608, the interval length is updated.

Figure 7:
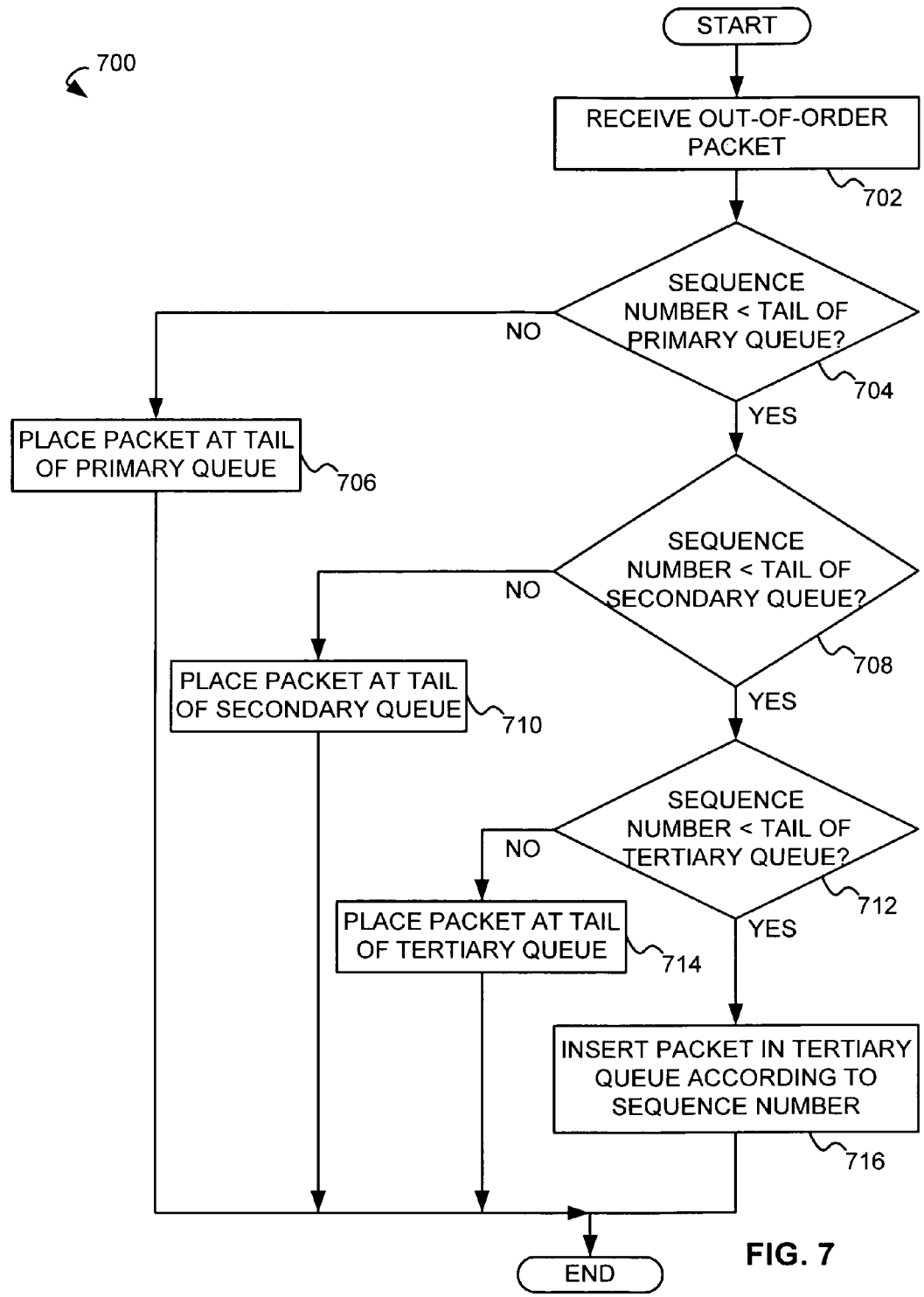
FIG. 7 is a flowchart of an exemplary process for populating data packets into a priority queue according to various embodiments.

FIG. 7 is a flowchart of an exemplary process 700 for populating data packets into a priority queue according to various embodiments. The priority queue allows queued data packets to be accessed by the processor in order according to the sequence numbers of the data packets. The process 700 may be performed by the ordering module 118 of the network device B 104. As is discussed in greater detail in connection with FIG. 8, the priority queue of exemplary process 700 comprises at least two queues.

In step 702, an out-of-order data packet is received. The data packet may be received as part of step 508 of process 500.

In step 704, the sequence number of the data packet is compared to the sequence number of the data packet at the tail of a primary queue. If the sequence number of the data packet is greater than the sequence number of the data packet at the tail of the primary queue, the data packet is placed at the tail of the primary queue in step 706.

In step 708, if the sequence number of the data packet is less than the sequence number of the data packet at the tail of the primary queue, the sequence number of the data packet is compared to the sequence number of the data packet at the tail of a secondary queue. If the sequence number of the data packet is greater than the sequence number of the data packet at the tail of the secondary queue, the data packet is placed at the tail of the secondary queue in step 710.

In step 712, if the sequence number of the data packet is less than the sequence number of the data packet at the tail of the secondary queue, the sequence number of the data packet is compared to the sequence number of the data packet at the tail of a tertiary queue. If the sequence number of the data packet is greater than the sequence number of the data packet at the tail of the tertiary queue, the data packet is placed at the tail of the tertiary queue in step 714.

In step 716, if the sequence number of the data packet is less than the sequence number of the data packet at the tail of the tertiary queue, the data packet is inserted into tertiary queue before another data packet according to its sequence number. Because inserting a data packet into a queue requires shifting higher numbered data packets, this operation is computationally more expensive than adding a data packet to the tail of the tertiary queue. As will be apparent to those skilled in the art, the sequence number may wrap.

Figure 8:
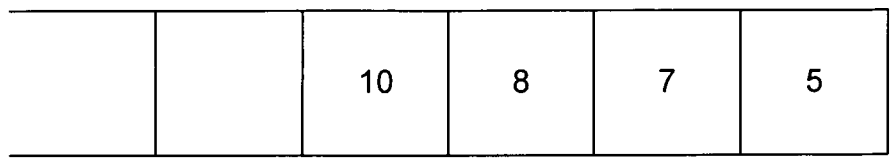
FIG. 8 is a diagram of an exemplary priority queue according to various embodiments.
Figure 8:
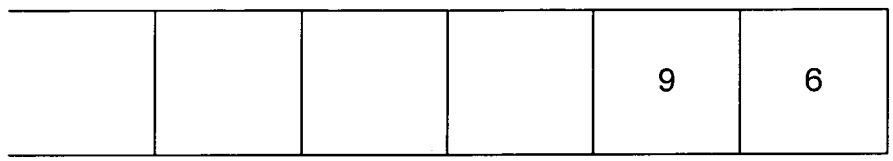
Figure 8:
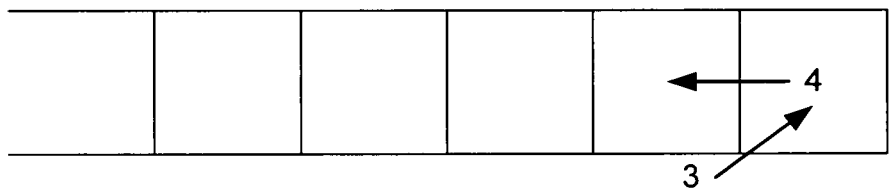

FIG. 8 is a diagram of an exemplary priority queue 800 according to various embodiments. For the purposes of illustration, the priority queue 800 is populated with sequence 802 according to the process 700. The priority queue 800 comprises a primary queue 804, a secondary queue 806, and a tertiary queue 808.

In the sequence 802, packet 1, the first packet in the frame, is received first and sent to the processor. Packet 5 is received next. Being the first out-of-order packet received, packet 5 is populated into the priority queue 800 as the head of the primary queue 804. Packet 7 is the third packet to be received. According to steps 704 and 706, packet 7 is placed at the tail of the primary queue.

Packet 6 arrives after packet 7. Because packet 6 has a lower sequence number than the tail of the primary queue (packet 7), packet 6 is populated into the priority queue 800 as the head of the secondary queue 806. Packet 8, arriving next and having a higher sequence number than the tail of the primary queue (packet 7), is placed at the tail of the primary queue.

The next packet in the sequence 802, packet 4, having a lower sequence number than the tail of the primary queue (packet 7) and the tail of the secondary queue (packet 6), is populated into the priority queue 800 as the head of the tertiary queue 808.

Packet 10, arriving next and having a higher sequence number than the tail of the primary queue (packet 8), is placed at the tail of the primary queue. Packet 9 arrives after packet 10. Because packet 9 has a lower sequence number than the tail of the primary queue (packet 10), packet 9 is populated into the priority queue 800 as the tail of the secondary queue 806.

Packet 3, arriving after packet 9, has a lower sequence number than the tail of the primary queue (packet 10) and the tail of the secondary queue (packet 9), and is populated into the priority queue 800 as the head of the tertiary queue 808 by shifting packet 4 out of the head position and inserting packet 3 into the head position.

When packet 2 arrives, packet 2 is sent to the processor, being sequential to the last serviced packet (packet 1). Packets 3 at the head of the priority queue 800, is sent to the processor. Because the head of the priority queue always has the lowest sequence number of the packets in each queue, subsequent packets, e.g., packets 4-10, can be sent to the processor in order by selecting the head of the queue having the lowest sequence number. To illustrate, packet 4 will be sent from the tertiary queue 808, then packet 5 will be sent from the primary queue 804 making packet 7 the new head of the primary queue. Next, packet 6 will be sent from the head of the secondary queue 806 to the processor and packet 9 will become the head of the secondary queue 806. In this example, the process will continue until packet 10 is sent to the processor.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for providing ordered data packets to a processor, the method comprising:
   receiving a plurality of data packets, each comprising an order identifier;
   placing at least one out-of-order data packet of the plurality of data packets in one of a plurality of priority queues, the priority queue being selected based on the order identifier of the received out-of-order data packet, the priority queues having a capability to receive data packets in non-sequential order;
   receiving one or more correction packets corresponding to two or more of the plurality of data packets;
   detecting one or more missing data packets or corrupted data packets of the plurality of data packets;
   correcting the one or more missing data packets or corrupted data packets of the plurality of data packets;
   providing the one or more corrected data packets to the processor;
   determining if a time-out period has elapsed, the time-out period based in part on an interval length based on previously received sequential packets; and
   providing the at least one out-of-order data packet in the priority queue to the processor if the time-out period has elapsed, the queued data packets to be accessed by the processor in order from the plurality of priority queues according to the order identifiers of the data packets.

2. The method of claim 1, further comprising:
   calculating an interval length between receiving one of the plurality of data packets and providing the one or more corrected data packets.

3. The method of claim 1, wherein the time-out period is a moving average of at least one differential delay.

4. The method of claim 1, wherein the time-out period is based on a distribution of at least one differential delay.

5. The method of claim 1, wherein more than one data correction packets are received per frame.

6. The method of claim 1, further comprising:
   calculating a differential delay based on the time between data packets provided to the network device; and
   updating an interval length based on the differential delay.

7. A system for providing ordered data packets to a processor, the system comprising:
   a receiving module configured to receive a plurality of data packets and one or more correction packets, each data packet comprising an order identifier and each correction packet corresponding to two or more of the plurality of data packets;
   a data correction module configured to detect one or more missing data packets or corrupted data packets of the plurality of data packets based on the one or more correction packets and correct the one or more missing data packets or corrupted data packets of the plurality of data packets based on the one or more correction packets; and
   an ordering module configured to place at least one out-of-order data packet of the plurality of data packets in one of a plurality of priority queues, the priority queue being selected based on the order identifier of the received out-of-order data packet, the priority queues having a capability to receive data packets in non-sequential order provide the one or more corrected data packets to the processor, determine if a time-out period has elapsed, the time-out period based in part on an interval length based on previously received sequential packets, and provide the at least one out-of-order data packet in the priority queue to the processor if the time-out period has elapsed, the queued data packets to be accessed by the processor in order from the plurality of priority queues according to the order identifiers of the data packets.

8. The system of claim 7, wherein the ordering module is further configured to calculate an interval length between receiving one of the plurality of data packets and providing the one or more corrected data packets.

9. The system of claim 7, wherein the time-out period is a moving average of at least one differential delay.

10. The system of claim 7, wherein the time-out period is based on a distribution of at least one differential delay.

11. The system of claim 7, wherein more than one data correction packets are received per frame.

12. The system of claim 7, wherein the ordering module is further configured to calculate a differential delay based on the time between data packets provided to the network device, and update an interval length based on the differential delay.

13. A non-transitory computer readable medium having embodied thereon instructions executable by a processor for performing a method for providing ordered data packets to a processor, the method comprising:
   receiving a plurality of data packets, each comprising an order identifier;
   placing at least one out-of-order data packet of the plurality of data packets in one of a plurality of priority queues, the priority queue being selected based on the order identifier of the received out-of-order data packet, the priority queues having a capability to receive data packets in non-sequential order;
   receiving one or more correction packets corresponding to two or more of the plurality of data packets;
   detecting one or more missing data packets or corrupted data packets of the plurality of data packets based on the one or more correction packets;

correcting the one or more missing data packets or corrupted data packets of the plurality of data packets based on the one or more correction packets;

providing the one or more corrected data packets to the processor;

determining if a time-out period has elapsed, the time-out period based in part on an interval length based on previously received sequential packets; and providing the at least one out-of-order data packet in the priority queue to the processor if the time-out period has elapsed, the queued data packets to be accessed by the processor in order from the plurality of priority queues according to the order identifiers of the data packets.

14. The computer readable medium of claim 13, wherein the method further comprises:

calculating an interval length between receiving one of the plurality of data packets and providing the one or more corrected data packets.

15. The computer readable medium of claim 13, wherein the time-out period is a moving average of at least one differential delay.

16. The computer readable medium of claim 13, wherein the time-out period is based on a distribution of at least one differential delay.

17. The computer readable medium of claim 13, wherein more than one data correction packets are received per frame.

18. The computer readable medium of claim 13, wherein the method further comprises:

calculating a differential delay based on the time between data packets provided to the network device; and updating an interval length based on the differential delay.

* * * * *